(12) United States Patent
Ziesig

(10) Patent No.: US 6,941,003 B2
(45) Date of Patent: Sep. 6, 2005

(54) METHOD OF FAST FINGERPRINT SEARCH SPACE PARTITIONING AND PRESCREENING

(75) Inventor: Donald R. Ziesig, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 559 days.

(21) Appl. No.: 09/923,839

(22) Filed: Aug. 7, 2001

(65) Prior Publication Data

US 2003/0039381 A1 Feb. 27, 2003

(51) Int. Cl.[7] ................................................. G06K 9/00
(52) U.S. Cl. ........................................ 382/124; 382/125
(58) Field of Search ................................. 382/115, 116, 382/124–127; 283/68, 69; 356/71; 340/5.53, 5.83; 235/380, 382, 382.5; 902/3–6

(56) References Cited

U.S. PATENT DOCUMENTS 4,135,147 A * 1/1979 Riganati et al. ............ 382/125
5,841,888 A * 11/1998 Setlak et al. ................ 382/124
6,041,133 A * 3/2000 Califano et al. ............ 382/124
6,064,753 A * 5/2000 Bolle et al. ................. 382/125

OTHER PUBLICATIONS

Fingerprint matching using transformation parameter clustering, by Germain et al., IEEE 1997, pp. 42–49.*
Fingerprint indexing based on novel feature of minutiae triplets, by Bhanu et al., IEEE 2003, pp. 616–622.*

* cited by examiner

Primary Examiner—Vikkram Bali
(74) Attorney, Agent, or Firm—Marsh Fischmann & Breyfogle LLP

(57) ABSTRACT

A method of fast fingerprint search space partitioning and prescreening is disclosed. The method comprises the steps of: inputting the contents of a fingerprint repository comprising file fingerprints for index creation; creating an index based on each minutia and selected neighbors of each minutia in each file fingerprint in the repository; searching the index to identify all minutiae which correspond to the minutiae in a search fingerprint; and analyzing results of this search to determine which file fingerprints contributed the most minutiae with the best correspondence to the minutiae in the search fingerprint.

21 Claims, 14 Drawing Sheets

Hash List Node

| Hash Code |
|---|
| Node Count |
| Repository Index[0] |
| Repository Index[1] |
| Repository Index[2] |
| Repository Index[3] |
| . . |
| Repository Index[26] |
| Repository Index[27] |
| Repository Index[28] |
| Repository Index[29] |

Figure 5. ExactMatch Flow Diagram

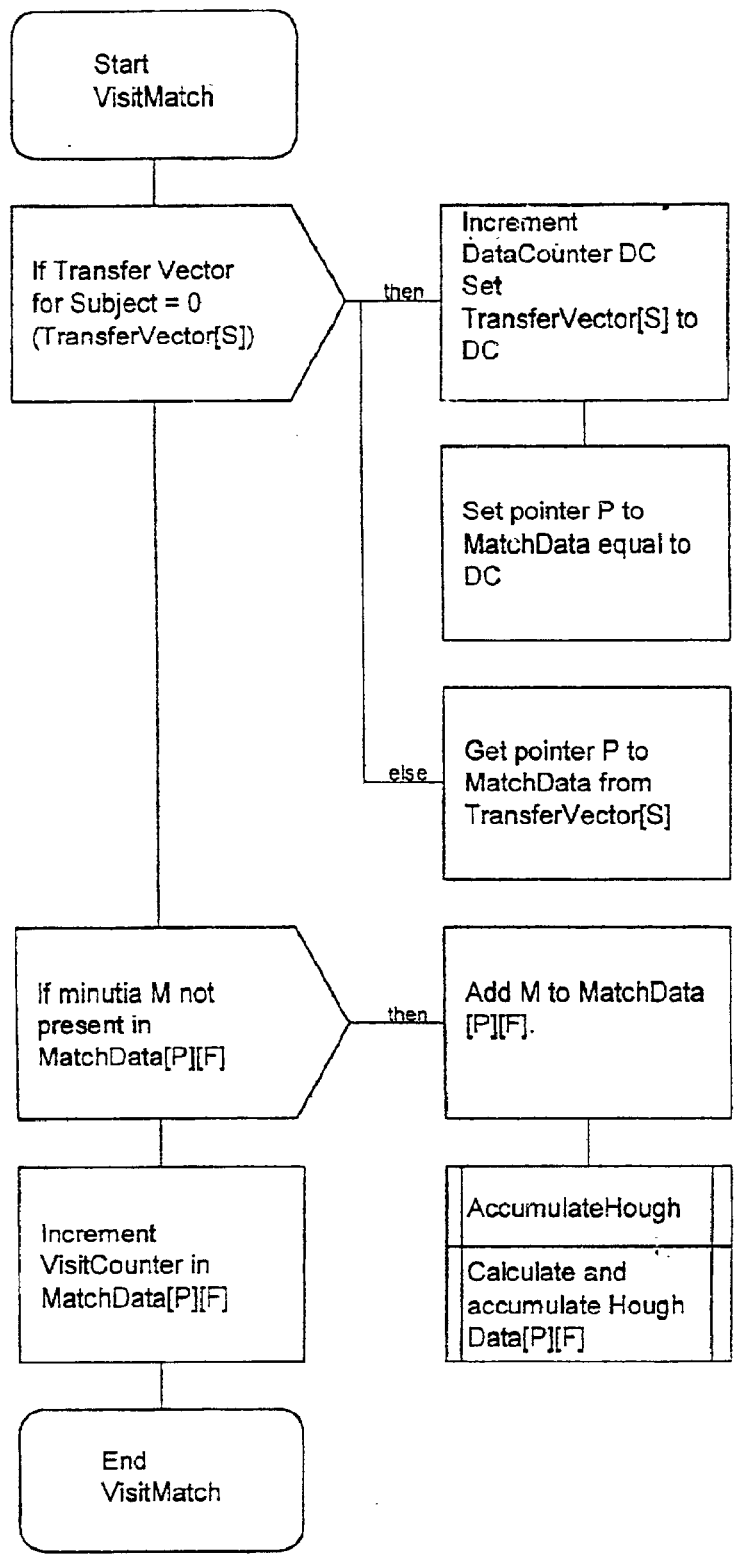
Figure 16. VisitMatch Subprogram Flow Diagram.

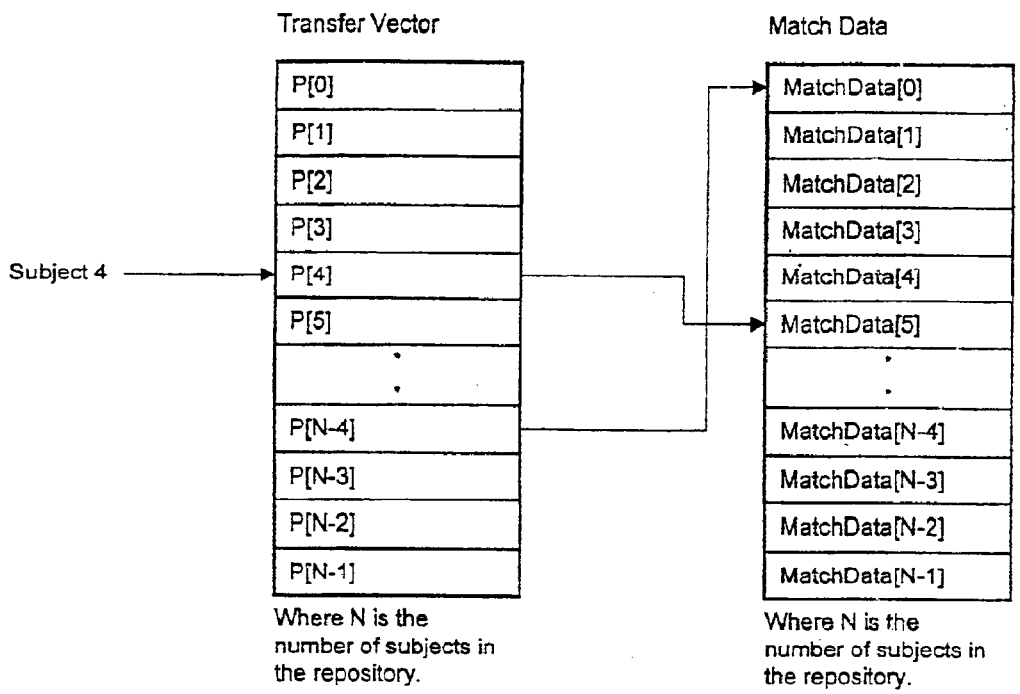
Figure 17. Transfer Vector Data.
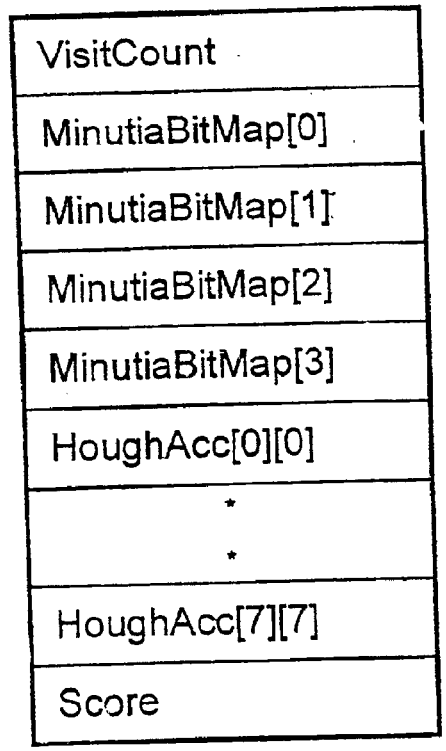

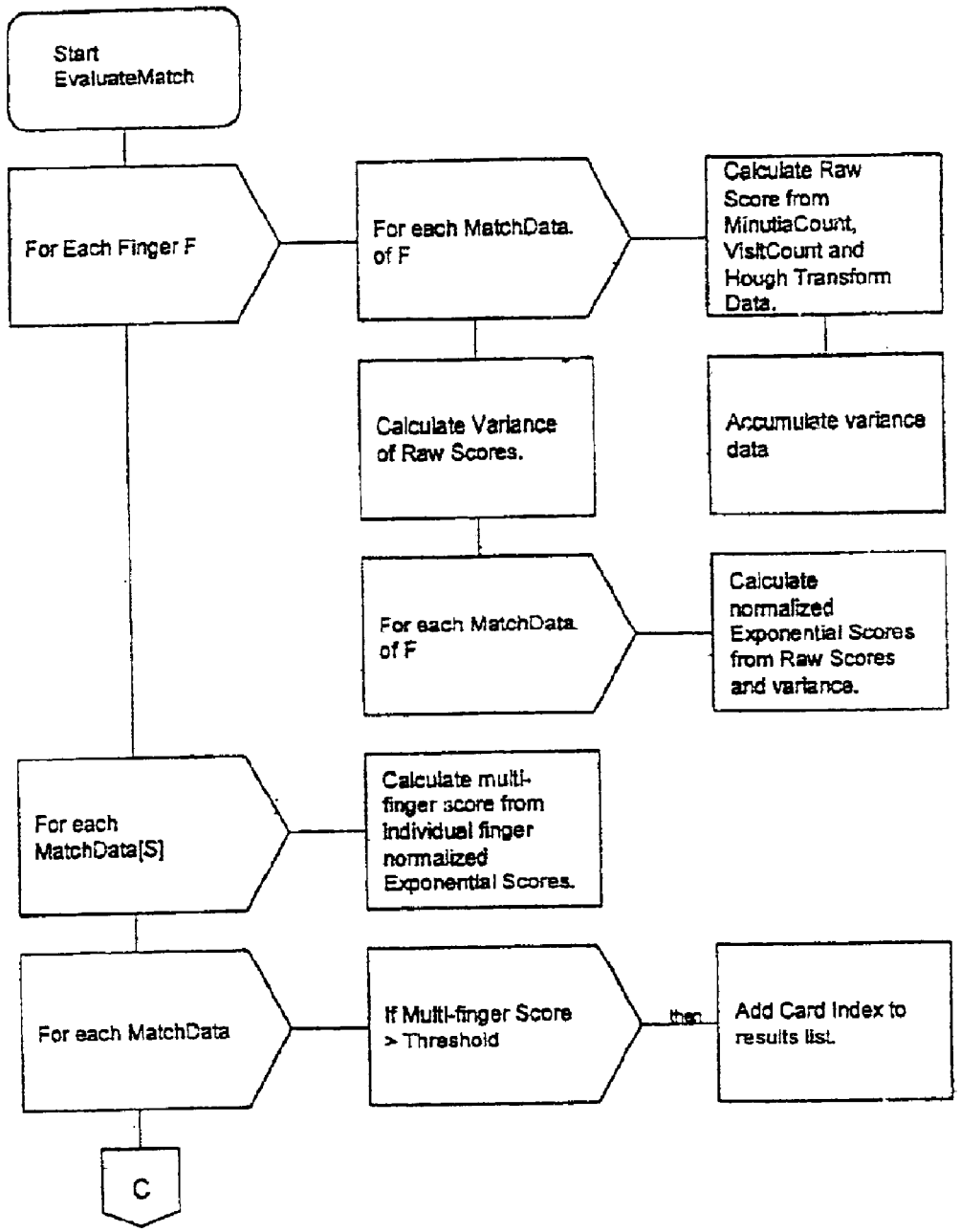
Figure 20. EvaluateMatch Subprogram Flow Diagram.

METHOD OF FAST FINGERPRINT SEARCH SPACE PARTITIONING AND PRESCREENING

BACKGROUND OF THE INVENTION

1. Field of the Invention

This invention generally relates to fingerprint matching systems in which a fingerprint is matched to reference fingerprints in a database, and more particularly, to a fingerprint matching system for rapidly locating matching fingerprints in a repository of fingerprint data containing a million or more fingerprints by pre-screening the repository of fingerprint data for likely matching fingerprints to create an index or list of candidate mated fingerprints.

2. Background of the Invention

Pattern matching or comparison schemes have many applications such as the matching of fingerprints for comparison with file fingerprints. Fingerprints are very rich in information content and basically contain two major types of information: 1) the ridge flow information, and 2) the specific features or minutiae (minutia) of the fingerprint. As used herein, the fingerprint to be identified may be termed an "unknown" fingerprint or a "latent" fingerprint.

Fingerprints uniquely identify an individual based on their information content. Information is represented in a fingerprint by the minutia and their relative topological relationships. The number of minutia in a fingerprint varies from one finger to another, but, on average, there are about eighty (80) to one hundred and fifty (150) minutia per fingerprint. In the fingerprint context, a large store of fingerprints exists in law enforcement offices around the country. These fingerprints include files of fingerprints of known individuals, made in conjunction with their apprehension or for some other reason such as security clearance investigation or of obtaining immigration papers, often by rolling the inked fingers on cards, and also includes copies of latent fingerprints extracted from crime scenes by various methods.

These reference fingerprints are subject to imperfections such as overinking, which tends to fill in valleys in fingerprints, and underinking, which tends to create false ridge endings, and possibly both overinking and underinking in different regions of the same fingerprint image. Smudging and smears occur at different places in the fingerprint due to unwanted movement of the finger, or uneven pressure placed on the finger, during the rolling process. The stored fingerprints are also subject to deterioration while in storage, which may occur, for instance, due to fading of the older images, or due to stains. Furthermore, the wide variation in the level of experience among fingerprint operators, and the conditions under which the fingerprint is obtained, produces wide variation in quality in the fingerprint images. Similar effects occur due to the variation of the scanning devices in cases of live scanning of fingerprints.

Matching of fingerprints in most existing systems relies for the most part on comparison of cores and deltas as global registration points, which tends to make the comparisons susceptible to errors due to the many sources of distortion and variations listed above, which almost always occur due to the various different inking, storage and reprocessing conditions which may be encountered.

As described at pages 164–191 of the text Advances in Fingerprint Technology, by Henry C. Lee and R. E. Guenssten, published by Elsevier in 1991, efforts have been underway for a long time to automate fingerprint identification, because manual search is no longer feasible due to the large number of reference files. The effort to automate fingerprint identification involves two distinct areas, namely (a) that of fingerprint scanning and minutia identification, and (b) comparison of lists of minutia relating to different fingerprints in order to identify those which match. Large files of reference fingerprints have been scanned, and minutia lists in digital form obtained therefrom, either by wholly automated equipment, or with semi-automated equipment requiring human aid. While not all problems in scanning of fingerprints and detection of minutia have been solved, it appears that the matching problem is the more pressing at this time.

The matching or search subsystem constitutes the most critical component of any Automated Fingerprint Identification System (AFIS). Its performance establishes the overall system matching reliability (the probability of declaring the correct mate, if one exists in the database), match selectivity (the average number of false candidates declared in each search attempt), and throughput, which is particularly important in large database systems. The unique identification of fingerprints is usually performed using the set of minutia contained in each fingerprint.

U.S. Pat. No. 5,613,014, issued Mar. 18, 1997 in the name of Eshera et al. describes a fingerprint matching technique using a graphical attribute relational graph (ARG) approach. This ARG approach is fast, and particularly advantageous for those cases in which the minutia of the latent or unknown fingerprint are numerous and well defined, but may be hindered in finding the correct match by errors in locating minutia near the center of each star when the latent image is poor and minutia are missing.

However, because the fingertip skin is flexible, the relative locations and orientation of the pattern singularities and minutiae differ (at least slightly) from one impression of a given finger to the next under controlled conditions (for example from multiple rolled prints of the same finger). These differences are magnified in latent, unknown fingerprints which are not made with the assistance of a fingerprint operator, but rather may be left a crime scene on different types of surfaces, such as flexible surfaces, under vastly differing pressures, with some times only a fraction of the finger area being involved. This invention addresses the problem of identifying candidate mate fingerprints in a repository for either rolled or latent search fingerprints.

SUMMARY OF THE INVENTION

Accordingly, it is an object of the present invention to overcome the deficiencies of the prior art in addressing the problem of identifying candidate mate fingerprints in a repository for either rolled or latent search fingerprints.

Yet another object of the present invention is to provide a method for fast fingerprint identification which rapidly locates matching fingerprints in a repository of fingerprint data containing a million or more fingerprints.

Yet another object of the present invention is to provide a method of fingerprint identification whereby a large repository of fingerprints is very rapidly searched for members of the repository that most nearly match the search print to create a list of candidate mate fingerprints that are then more carefully search for matching features.

Still another object of the present invention is to provide a method of fast fingerprint identification wherein the index is based on each minutia and selected neighbors of each minutia in each file fingerprint in the repository and then the index is subsequently searched to identify all minutiae which correspond to the minutiae in a search fingerprint. The results of this search are analyzed to determine which file fingerprints contributed the most minutiae with the best correspondence to the minutiae in the search fingerprint.

These and other objects, advantages and features of the present invention are achieved by a method comprising the steps of: inputting the contents of a fingerprint repository comprising file fingerprints for index creation; creating an index based on each minutia and selected neighbors of each minutia in each file fingerprint in the repository; searching the index to identify all minutiae which correspond to the minutiae in a search fingerprint; and analyzing results of this search to determine which file fingerprints contributed the most minutiae with the best correspondence to the minutiae in the search fingerprint.

BRIEF DESCRIPTION OF THE DRAWINGS

FIG. 16 illustrates the steps of the VisitMatch subprogram;

FIG. 17 illustrates transfer vector data;

FIG. 18 illustrates match data;

FIGS. 20 and 21 illustrate the steps of the EvaluateMatch subprogram.

DETAILED DESCRIPTION OF THE PREFERRED EMBODIMENT(S)

Figure 1:
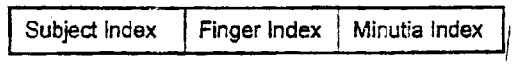
FIG. 1 is a block diagram representing repository index data.

The following terms used in this disclosure are defined as set forth below.

Fingerprint characteristics—Data describing a fingerprint that has been automatically or manually extracted from an image of the fingerprint. This data includes but is not limited to the Pattern Classification and a set of Fingerprint Minutiae (typically 10 to 200).

Fingerprint Repository—One or more files containing the characteristics of multiple fingerprints.

Fingerprint Minutiae—Endings or Bifurcations in the friction ridges of a fingerprint. Also known as Galton points or Level 2 details.

Pattern Classification—Enumeration of the general patterns of the flow of the friction ridges of a fingerprint, the most common being arches, loops and whorls. Also known as Level 1 details.

Minutia Data—Data describing the position, type, and orientation of a given minutia, and the relationship of that minutia to its neighboring minutiae.

Pattern Singularities—Discontinuities in the general flow of the friction ridges of a fingerprint, the most common being cores and deltas. The number, types and relative locations of the Pattern Singularities determine the Pattern Classification.

File Print—A fingerprint whose characteristics have been stored in a repository.

Search Print—A fingerprint that is being sought in the repository.

Mate (Print)—The File Print (or prints) which correspond to the subject (person) who generated the Search Print.

Rolled Print—A fingerprint obtained by rolling the subject finger across the acquisition surface. File prints are almost exclusively rolled prints. Search prints may or may note be rolled prints.

Latent Print—A fingerprint impression left at the scene of a crime or developed into an image by investigators.

In accordance with the teachings of the present invention, there is provided a method for rapidly locating matching fingerprints in a repository of fingerprint data containing a large number of fingerprints wherein the method creates an index into the repository which is based on each minutia and selected neighbors of each minutia in each file fingerprint in the repository. The index is subsequently searched to identify all minutiae that correspond to the minutiae in a search fingerprint. The results of this search are analyzed to determine which file fingerprints contributed the most minutiae with the best correspondence to the minutiae in the search fingerprint.

The input data for the creation of the index are the contents of a fingerprint repository (or any fingerprints that are to be added to an existing repository), or a set of characterized search fingerprints. For each fingerprint (either file or search) processed according to one embodiment of the method of the present invention, the following data are used:

The number of minutiae in the fingerprint.
For each minutia:
The base angle of the minutia in a frame of reference whose angular orientation to and permissible deviation from the axis of the finger is pre-defined by customer specification.
The Cartesian coordinates (X, Y) of the minutia relative to the same frame of reference.
The minutia index of the nearest neighboring minutia (if any) in each of eight octants (45 degree wedges), the first octant of which is centered on the base angle of the minutia. (These minutiae are known as "octant neighbors"). Note that minutiae which fall near the edge of the fingerprint may not have neighbors in all octants.
The count of friction ridges between the minutia and each of its eight octant neighbors.
The Euclidean distance between the minutia and each of its eight octant neighbors.
The difference between the base angle of the minutia and the base angle of each of its eight octant neighbors.

It should be noted that the above example describes the implementation based on ARG data used in the patented LMIS ARG Matcher as disclosed by U.S. Pat. No. 5,613,014, issued Mar. 18, 1997, the entire disclosure of which is herein incorporated by reference. Other implementations, which are envisioned to be within the scope of the present invention, may use additional (or different) data and still work as well or better than the currently described embodiment. For example, high-resolution direction-to-the-octant-neighbor can be included to improve the speed, reliability and selectivity of the algorithm, providing those data are available in the repository. However, it should be noted that a primary feature of the method of the present invention is that data for neighboring minutiae are used in the index.

Each minutia in the repository, and in any fingerprint that is added to the repository, is uniquely identified by a repository index, shown in FIG. 1, which contains the following information:

The index of the subject in the repository (typically starting at zero and increasing by one as each subject is added to the repository).

The index of the finger within the subject (typically starting at zero for the right thumb and continuing through 9 for the left little finger).

The index of the minutia within the subject and finger (typically starting at zero and increasing by one until the maximum number of minutiae allowed in the repository is reached).

Figure 2:
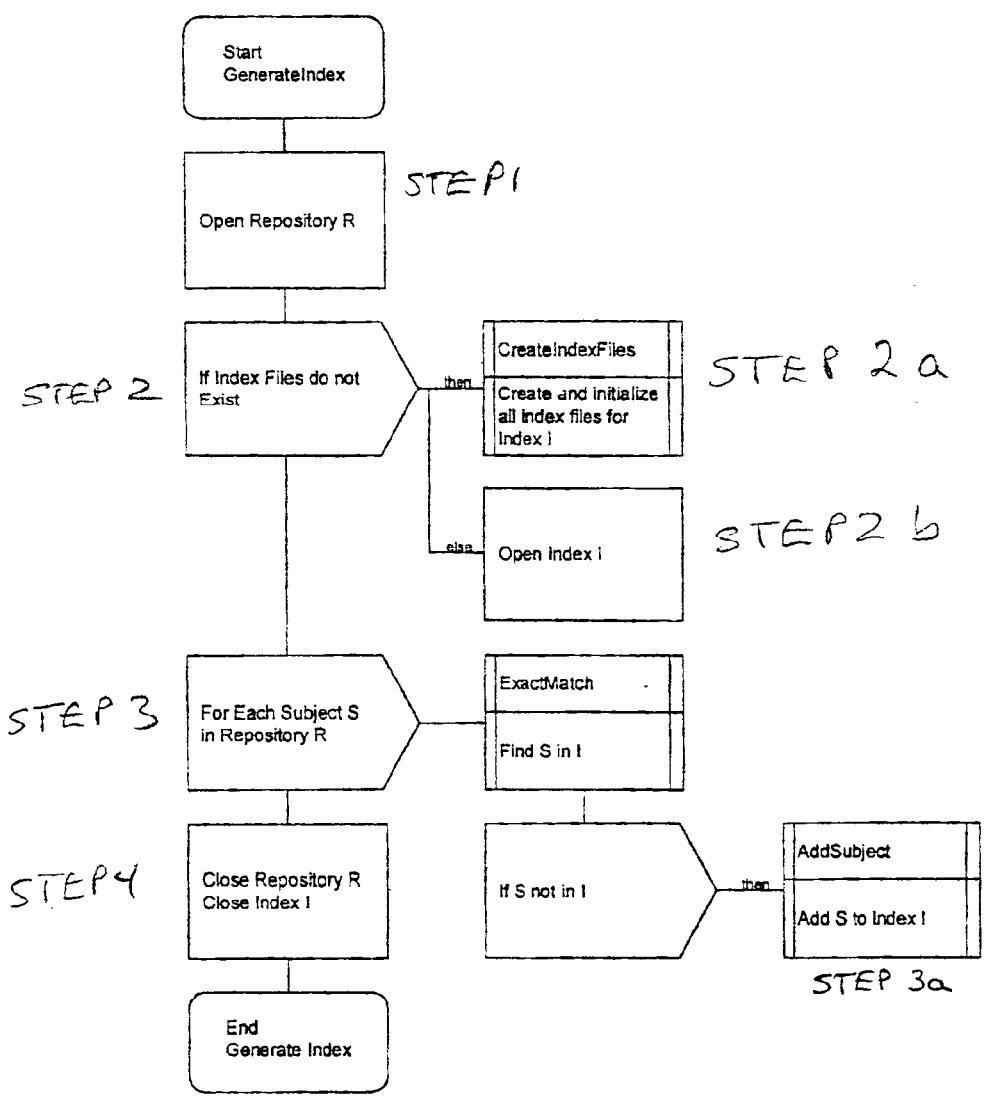
FIG. 2 is a block diagram illustrating the steps for generating an index of fingerprint files from the repository.

In accordance with the teachings of the present invention, the method creates the data files associated with the index and adds from one to all of the fingerprints in the repository to the index. Referring to FIG. 2, in step 1, the repository file(s) in the repository R are opened for read-only access. In step 2, a determination is made as to whether or not index files exist. In step 2A, if the index files do not already exist, the subprogram CreateIndexFiles, as will be more fully described with respect to FIG. 3, creates the index files and opens them for read-write access. Otherwise, in step 2b the files of the existing index are opened for read-write access. A user-specified set of repository subjects can also be added manually to the index, in accordance with known methods, for example, without limitation, using records in control files, or fields in a graphic user interface or the like.

In step 3, for each subject S in the repository of fingerprint files to be added to the index, Subprogram ExactMatch is used to determine whether subject S is already in the index. This is done to avoid introducing duplicate records in the index, since the presence of duplicate records would bias the search results towards the selection of those subjects duplicated in the index.

In step 3a, if the subject S is not already in the index, subprogram AddSubject is used to add subject S to the index. In step 4, once all subjects S in the repository have been scanned and the non-duplicative subjects have been added to the index, the repository and index files are closed.

Figures 3, 4:
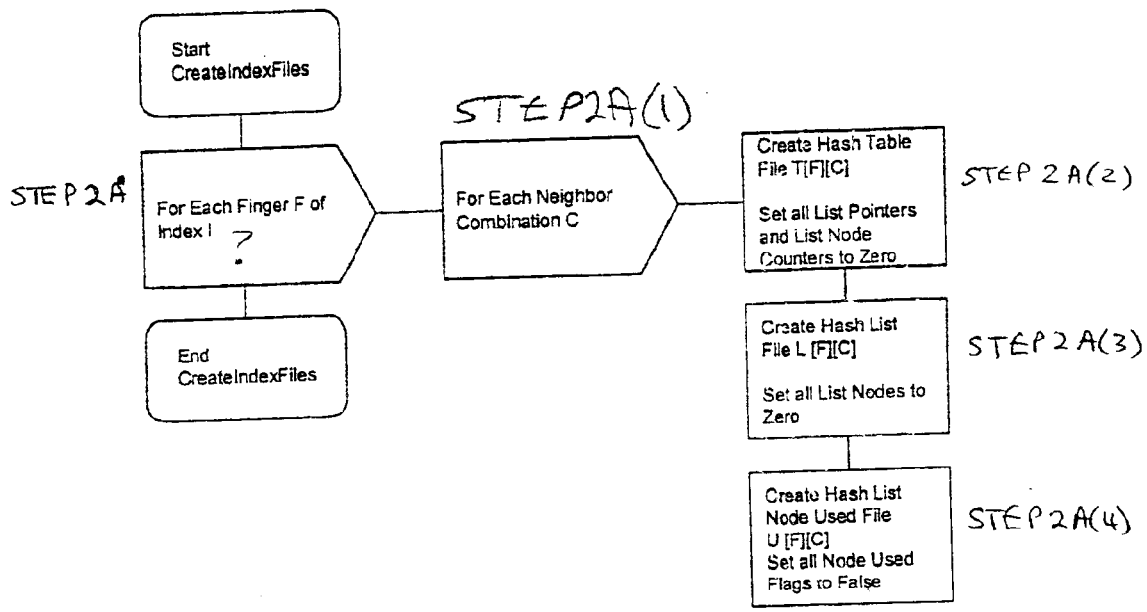
FIG. 3 is a block diagram illustrating the steps of the CreateIndexfiles subroutine for creating each of the files of the a specific index.
FIG. 4 illustrates the data contained in a hash list node.

FIG. 3 illustrates the individual steps of the CreateIndex-Files subprogram used to create the all the files needed for a specific index I. In this regard, it is important to note that an index can be created for any subset of ten fingers. Typically, the two index fingers are used for rolled search capability, however, all ten fingers is needed for latent search capability where the source finger number is unknown. In step Step 2(a)1 of the CreateIndexFiles subroutine, index neighborhood combinations are created for each finger of the index. Neighbor combinations are based on selecting 2 of eight octant neighbors to produce 28 possible combinations per finger, as shown in Table 1. In one embodiment of this subprogram of the present invention, all combinations of two neighbors (N=2) out of 8 neighbors are used, however N may be 1, 2, 3, 4, 5, 6 or 7. For the available LMIS ARG data, N=2 is the best, but N=3 has potential value for other fingerprint data, for example, when there is no ridge count data, in which case N=3 is better than N=2.

TABLE 1

All combinations of two neighbors out of eight neighbors.

| Combination | Minutia A | Minutia B |
|---|---|---|
| 0 | 0 | 1 |
| 1 | 0 | 2 |
| 2 | 0 | 3 |
| 3 | 0 | 4 |
| 4 | 0 | 5 |
| 5 | 0 | 6 |
| 6 | 0 | 7 |
| 7 | 1 | 2 |
| 8 | 1 | 3 |
| 9 | 1 | 4 |
| 10 | 1 | 5 |
| 11 | 1 | 6 |
| 12 | 1 | 7 |
| 13 | 2 | 3 |
| * | * | * |
| 24 | 5 | 6 |
| 26 | 5 | 7 |
| 27 | 6 | 7 |

In step 2(a)2, one Hash Table file T is created for each Finger/Neighbor Combination. A hash table consists of 32,768 entries, each of which contains the following data:

The index of a hash list node in the hash list file.

The number of hash list nodes associated with the hash code

There are 56 Hash Table files T[2][28]. In this regard, the 32,768 entries are based on a 15-bit hash code. This is probably the smallest practical hash code for fingerprint applications and is based on the LMIS ARG data. If other data were available, the number could increase to more than 4 million, which would give better performance. The data elements of an entry are independent of the number of entries (they would still be a hash list node index and a hash list node count).

In step 2(a)3, one Hash List file L is created for each Finger/Neighbor Combination. A hash list consists of N hash list nodes, where N is a function of the number of minutiae in the repository, plus any room needed for repository expansion. Each Hash List Node contains the following data, as shown also in FIG. 4:

The Hash Code associated with the buffer (needed for data reliability checking, but otherwise not used in the algorithm).

The number of populated repository index (FIG. 1) slots in the buffer.

Thirty repository index slots.

There are 56 Hash List files L[2][28]. The optimum number of slots in a node is a function of the hash code distribution that, in turn, is a function of the fingerprint characteristics in the repository. For the LMIS ARG data the absolute best is 24 slots, but 30 is nearly as good and offers the additional benefit of producing a node size that is a power of 2 and thus much more efficient in terms of practical disk operations.

In step 2(a)4, one Hash List Node Used file U is created for each Finger/Neighbor Combination. A Hash List Node Used file is a bookkeeping device which tracks which hash list nodes in the file are populated at any given time. There is exactly one bit in the Hash List Node Used file for each node in the associated Hash List file. The bit associated with a given node is set to 1 when that node is in use and cleared to 0 when the node is available for use. There are 56 Hash List Node Used files U[2][28].

Figure 5:
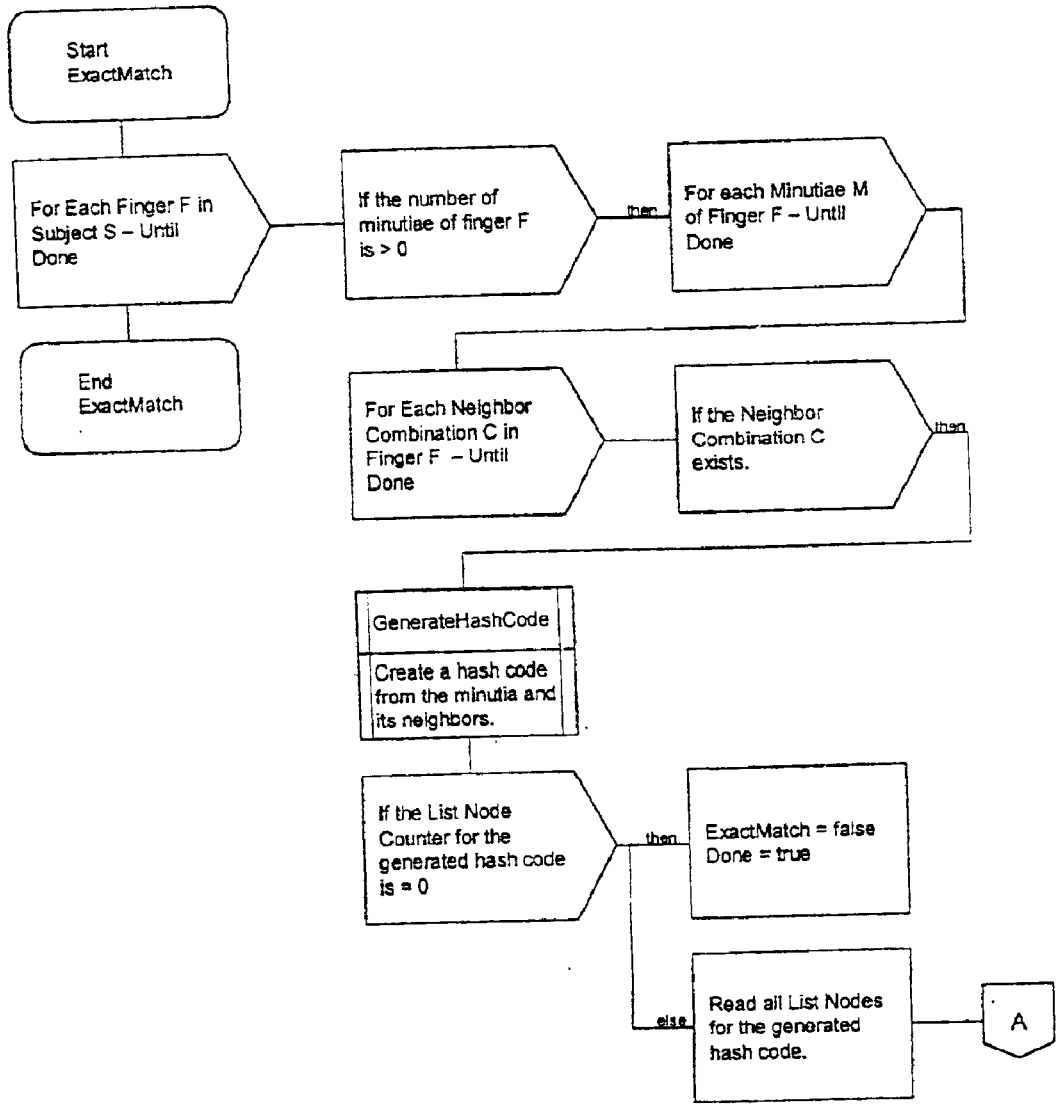
FIGS. 5 and 6 illustrate the steps of the ExactMatch subprogram.
Figure 6:
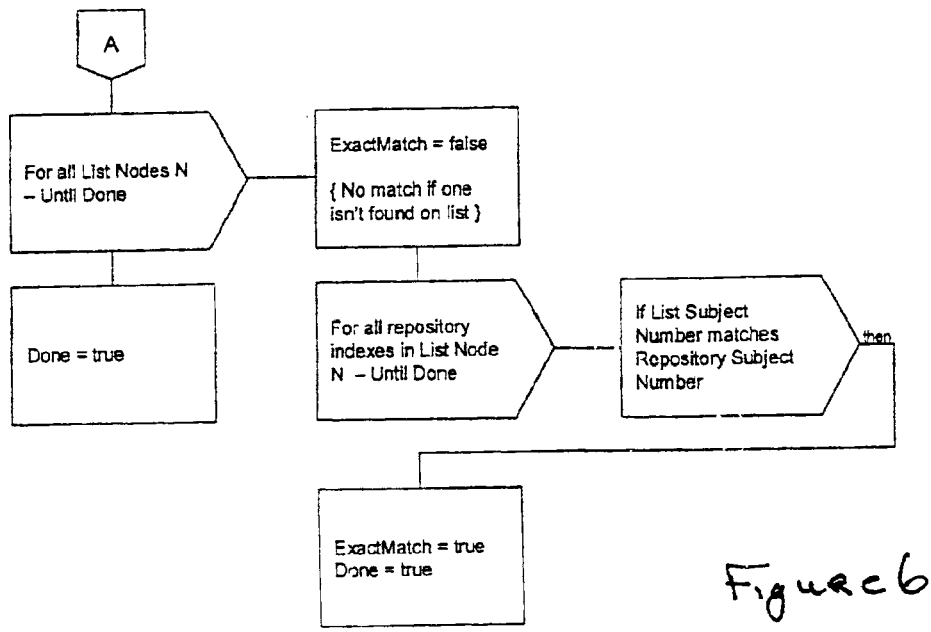

One embodiment of the details of step 3 shown in FIG. 2 relating to the ExactMatch subprogram are shown in FIGS. 5 and 6. As previously noted, the ExactMatch subprogram determines if a specific subject S from the Repository R is already present in the Index I. This subprogram takes advantage of the fact that a duplicate subject in the repository is, by definition, guaranteed to have the identical hash code and the identical repository index as one already in the index. Therefore, the presence of the first existing combination associated with the first neighbor of the first minutiae of the first finger of the subject is indicative of a duplicate while the absence is indicative that the subject is not in the index.

The first set of process steps in the embodiment of the ExactMatch subprogram shown in FIG. 5 are used to identify the first existing combination associated with the first neighbor of the first minutiae of the first finger of the subject. The hash code for that neighbor combination is calculated and used to search the appropriate hash table. If there are no hash list nodes associated with the hash code, there is no duplicate entry in the index, ExactMatch is false and the subprogram terminates.

If there are hash list nodes associated with the hash code, the subprogram reads them from the disk and searches each in order until either the subject index is found or the end of the list is reached. If the subject index is found, ExactMatch is true else ExactMatch is false; in both cases, the subprogram terminates.

Figure 7:
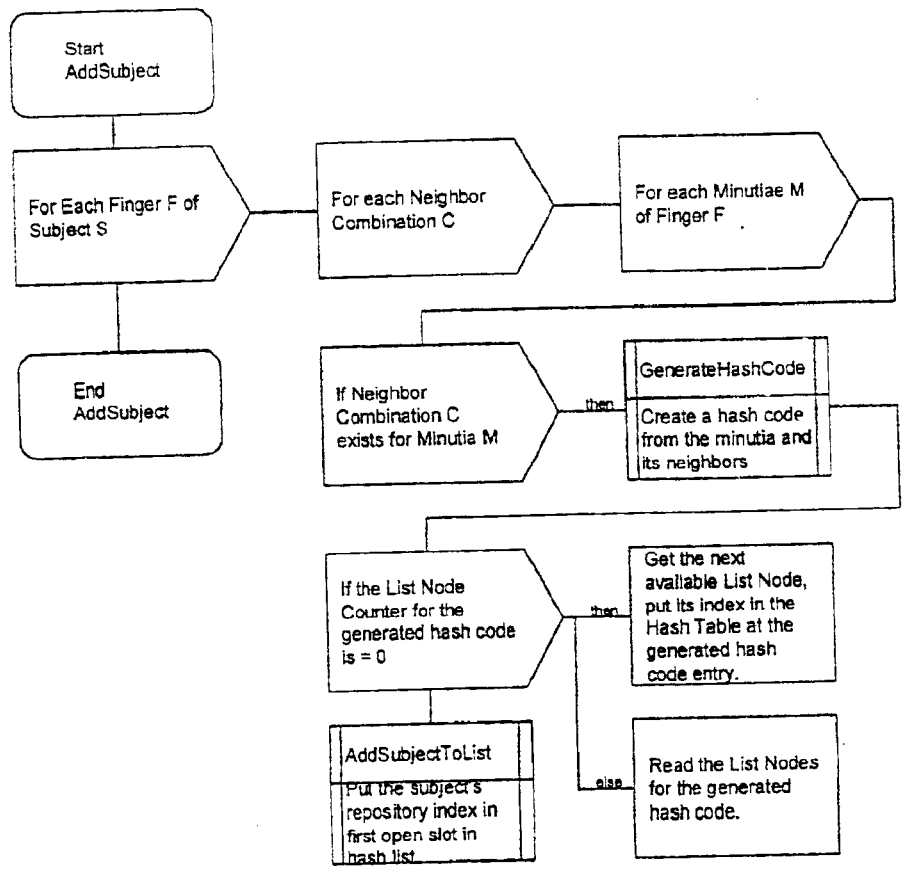
FIG. 7 illustrate the steps of the AddSubject subprogram.

A detail description of one embodiment of the individual process steps of the AddSubject subprogram of Step 3a of the method of the present invention are shown in FIG. 7. As previously noted with particular reference to FIG. 2, the AddSubject subprogram adds each existing neighbor combination of each minutia of each finger of the subject S into the index I.

As seen in FIG. 7, the AddSubject subprogram first selects the Finger F, Neighbor Combination C and Minutia M of each of the subject(s) being added (S). Note that F and C are used to select the appropriate Hash Table T[F][C], Hash List L[F][C] and Hash List Node Used U[F][C] files. If the Neighbor Combination C exists for Minutia M, the following steps are taken: 1) Generate a hash code from the minutia and neighbor parameters and locate the hash code entry in the Hash Table T[F][C]. 2) If no prior hash list nodes are associated with the hash code, identify the next available node in the Hash List file L[F][C], store its index in T[F][C] and update U[F][C] appropriately. If prior hash list nodes are associated with the hash code, read them into memory and 3) Invoke AddSubjectToList to insert the subject (S) repository index into the first available slot in the Hash List L[F][C].

Figure 8:
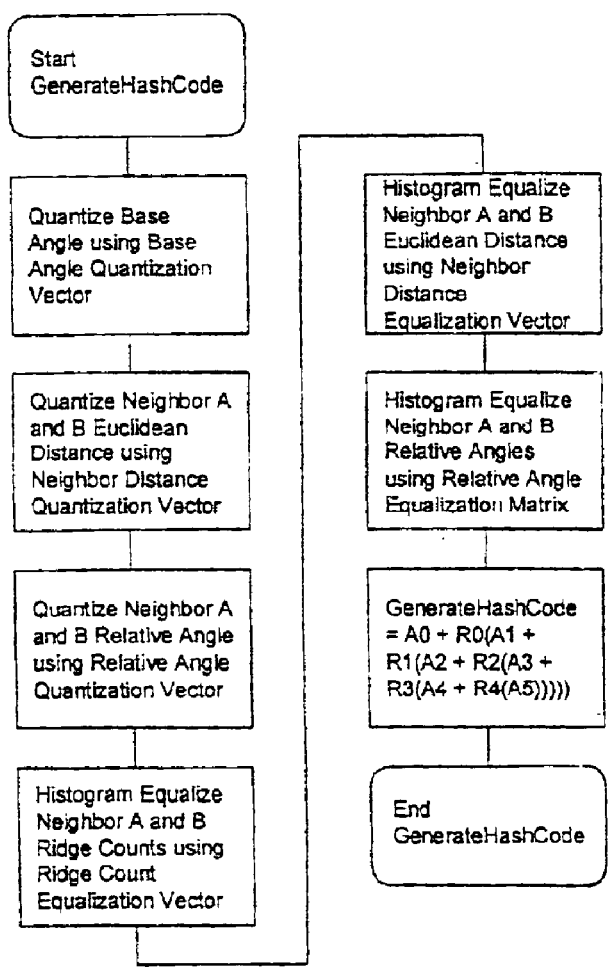
FIG. 8 illustrates the steps of the GenerateHashCode subprogram.

The steps of one embodiment of the GenerateHashCode subprogram are shown by the flow diagram of FIG. 8. The GenerateHashCode subprogram produces a 15-bit hash code from the parameters of a specified Minutia M and neighbor combination C. The neighbors in the flow diagram and this section are labeled Neighbor A and Neighbor B. The values of A and B are selected, as a function of neighbor combination C, from Table 1. The ideal hash code generation would cause each of the 32,768 possible values to be equally likely. The algorithm used here approaches, but does not meet this ideal, due primarily to the distribution of the fingerprint characteristics in the repository.

Figure 9:
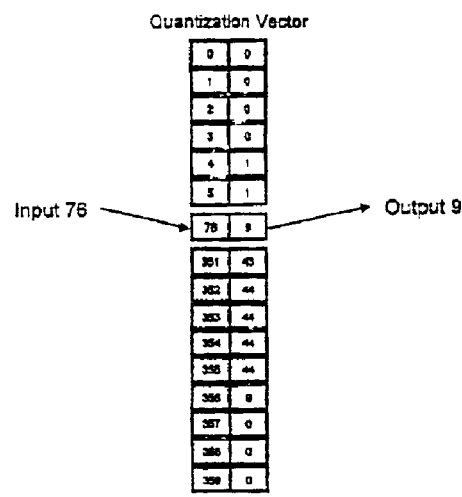
FIG. 9 illustrates a typical quantization vector.

The Base Angle, Euclidean Distances to neighbors A and B and the Relative Angles to neighbors A and B of minutia M are quantized using Quantization Vectors as shown in FIG. 9. The contents of the Quantization Vectors are selected based on the distribution of parameters in the repository R. Experimental evidence shows that they may be generated from a subset of R and left unchanged as R grows.

It should be noted that the quantization vectors are created by analyzing, on a minutia-by-minutia basis, the difference between mated pairs of fingerprint rollings. This is done by calculating the mean and standard deviation of the difference between each parameter. The value of the mean sets the starting point of the vector. The standard deviation is used to select the quantization interval. The value of the quantization vector components could change slightly based on the characteristics of a particular set of fingerprints (i.e., if one wanted to optimize the performance on fingerprints of males vs. females) or, in the case of the base angle, on the definition of "oriented" fingerprints as being +/−some angle.

Figure 10:
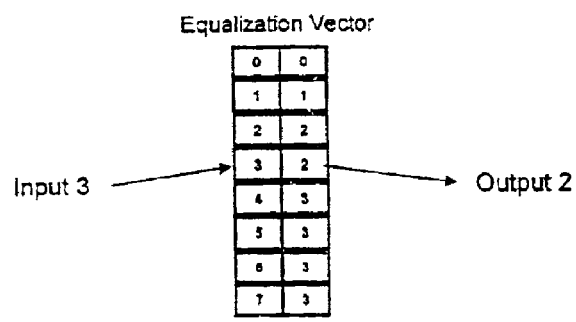
FIG. 10 illustrates a typical equalization vector.

The Ridge Counts to neighbors A and B, and the Euclidean Distances to neighbors A and B are histogram equalized using Equalization Vectors, as shown in FIG. 10. As with the contents of the Quantization Vectors, the contents of the Equalization Vectors are selected based on the distribution of parameters in the repository R. Experimental evidence shows that they may be generated from a subset of R and left unchanged as R grows. The Equalization Vectors and Matrices are important only in the sense that they reduce the size of the hash code (i.e., 15 bits compared to say 20 bits) without significant impact on performance. The reduction of the size of the hash code reduces the amount of memory needed. Were memory not an issue, the Equalization Vectors can be eliminated and the larger hash code/memory usage accepted.

Figure 11:
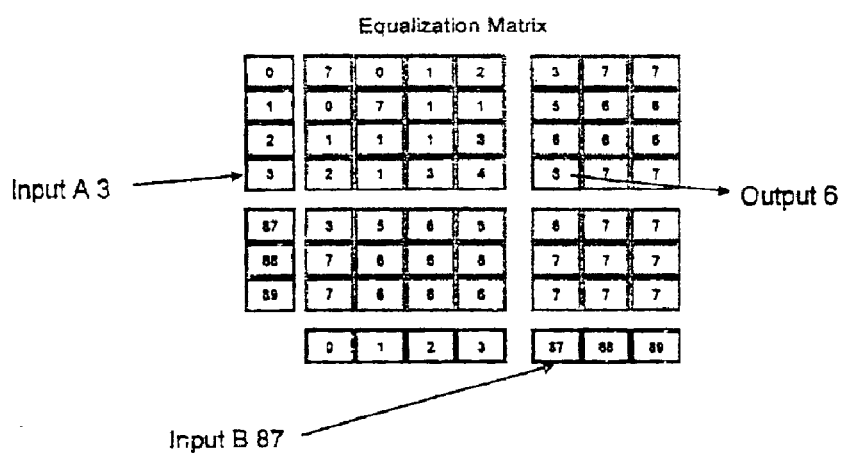
FIG. 11 illustrates a typical equalization matrix.

The Relative Angle to neighbors A and B are histogram equalized into a single value using an Equalization Matrix as shown in FIG. 11. Again, the contents of the Equalization Matrix are selected based on the distribution of parameters in the repository R. Experimental evidence shows that they may be generated from a subset of R and left unchanged as R grows. Once all of the parameters have been quantized and equalized, they are combined into a single hash code as shown in Equation 1.

$$C_h = A_0 + R_0(A_1 + R_1(A_2 + R_2(A_3 + R_3(A_4 + R_4(A_5)))))$$

$C_h$ is the generated Hash Code
$A_0$ is the qunatized Base Minutia Direction
$R_0$ is the range of the Base Minutia Direction
$A_1$ is the equalized Neighbor A Ridge Count
$R_1$ is the range of the equalized Neighbor A Ridge Count
$A_2$ is the range of the equalized Neighbor B Ridge Count
$A_3$ is the equalized, normalized Neighbor A Euclidean Distance
$R_3$ is the range of the equalized normalized Neighbor A Euclidean Distance
$A_4$ is the equalized, normalized Neighbor A Euclidean Distance
$A_5$ is the two-dimension equalized, normalized Neighbor A and Neighbor b relative Directions Equation 1. Hash Code Generation.

Figure 12:
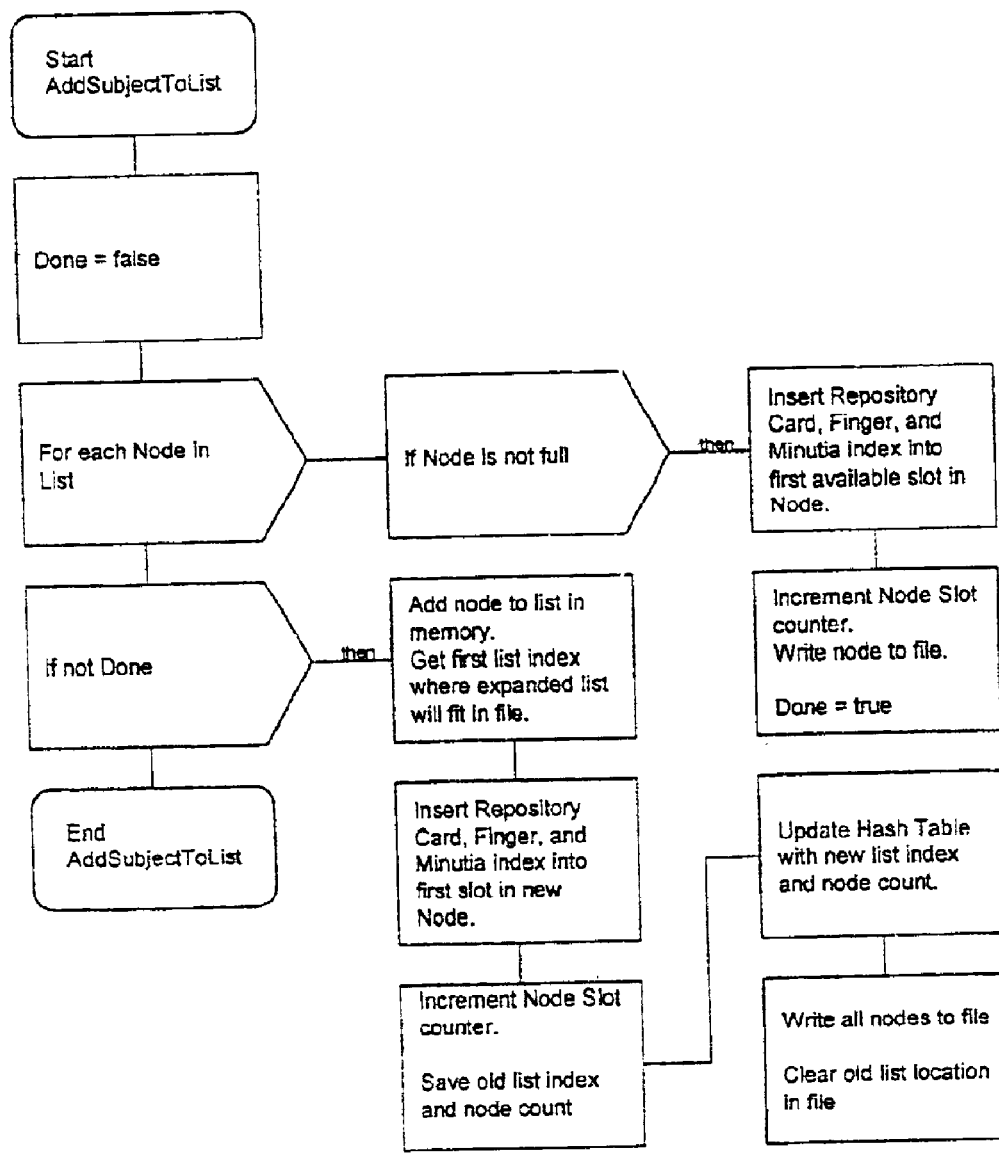
FIG. 12 illustrates the steps of the AddSubjectToList program.

The AddSubjectToList subprogram flow diagram is shown in FIG. 12. The AddSubjectToList subprogram presumes that the hash list node data for a given hash code is resident in memory.

Prior to invocation, existing nodes for a given hash code must be read into memory. Prior to invocation, if there are no pre-existing nodes, the memory buffer for the first node must be cleared. Each node in the list is searched for an available slot. If an available slot is found, the subject S's repository index is inserted in the slot, the node containing the slot is written to the file and done is set true.

If done is false, the implication is that all pre-existing nodes are full. In this case, a new node is appended in memory, and the subject S's repository index is inserted in the first slot. Since a node has been added, the list will no longer fit in its original location. The Hash List Node Used file U[F][C] is searched for the first available set of contiguous nodes which fit the new list size. The list data are written into these nodes. The hash table T[F][C] is updated, the previous node list locations are cleared and U[F][C] is updated to reflect the new node usage.

Figure 13:
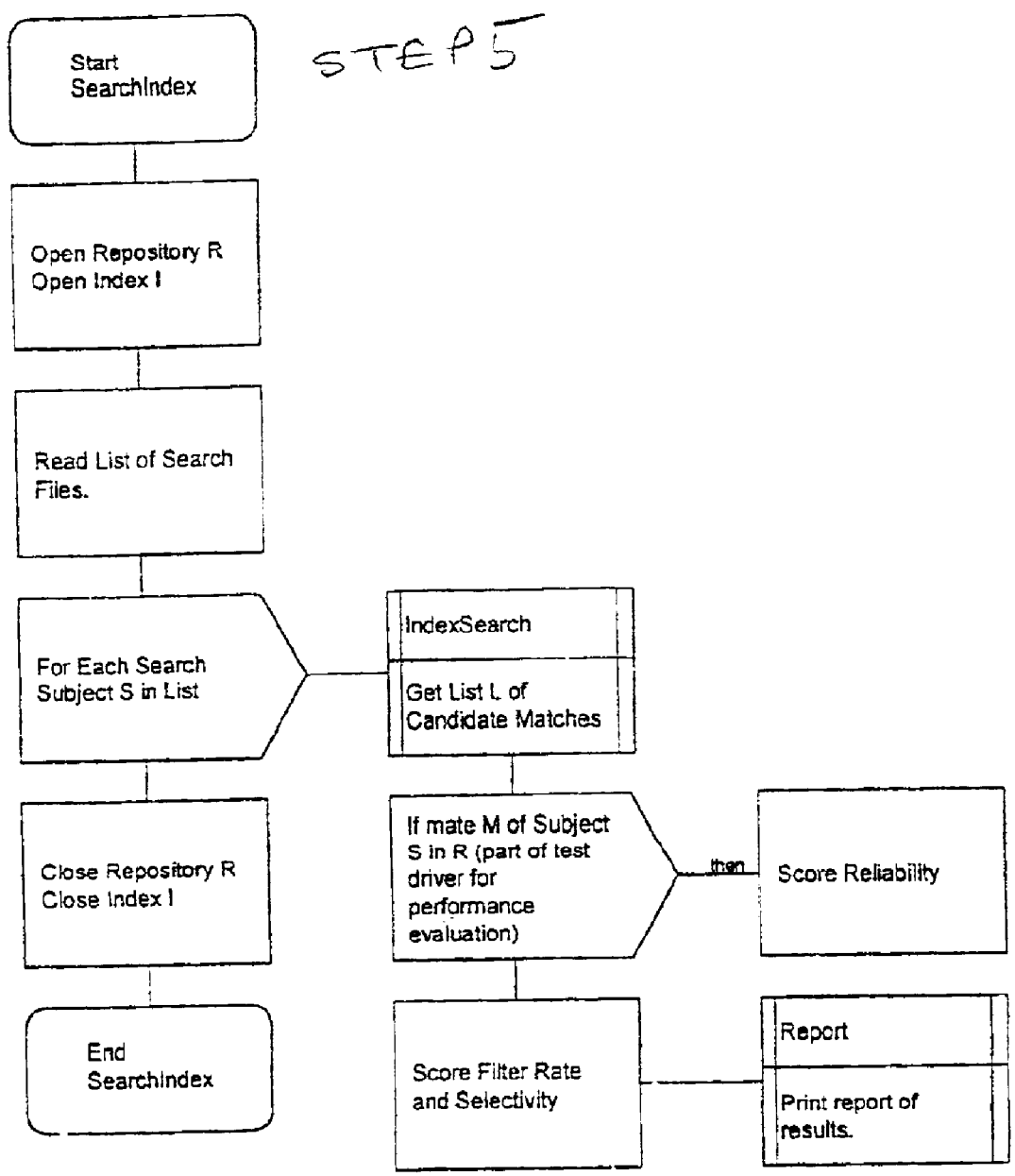
FIGS. 13 illustrate the steps of the SearchIndex program.

Once an index is created, step 5 of the method of the present invention is to locate the most likely candidate mate(s) for search subject S in index I. Step 5 of the method of the present invention comprises, for example, the SearchIndex program, a flow diagram of which is shown in FIG. 13. The SearchIndex program searches for the mates, in the index I, of each entry in a list of search subjects. This program includes "truth" data to allow the performance of the IndexSearch subprogram, which implements the search process itself, to be evaluated. A list of search subjects is read, the index is searched for each subject, the performance is evaluated and a report generated.

Figure 14:
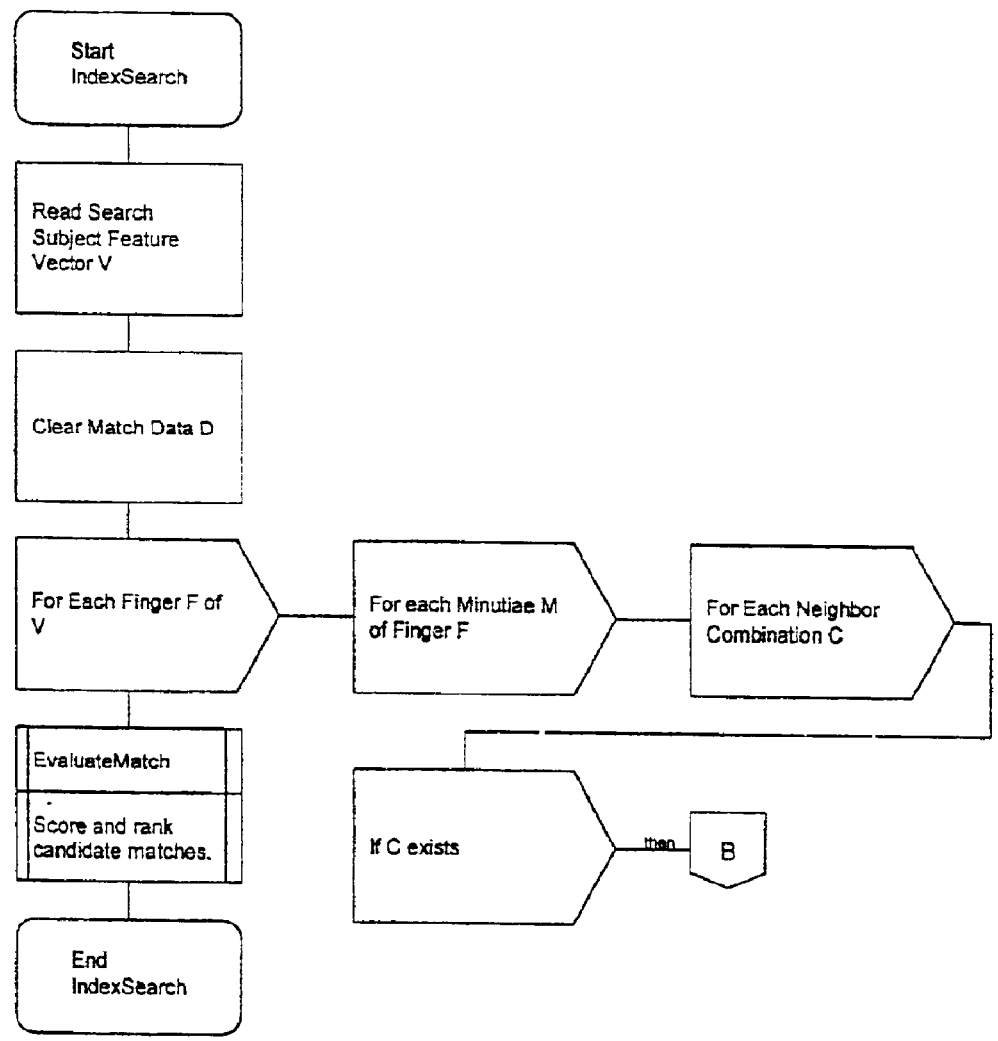
FIGS. 14–15 illustrate the steps of the IndexSearch subprogram.
Figure 15:
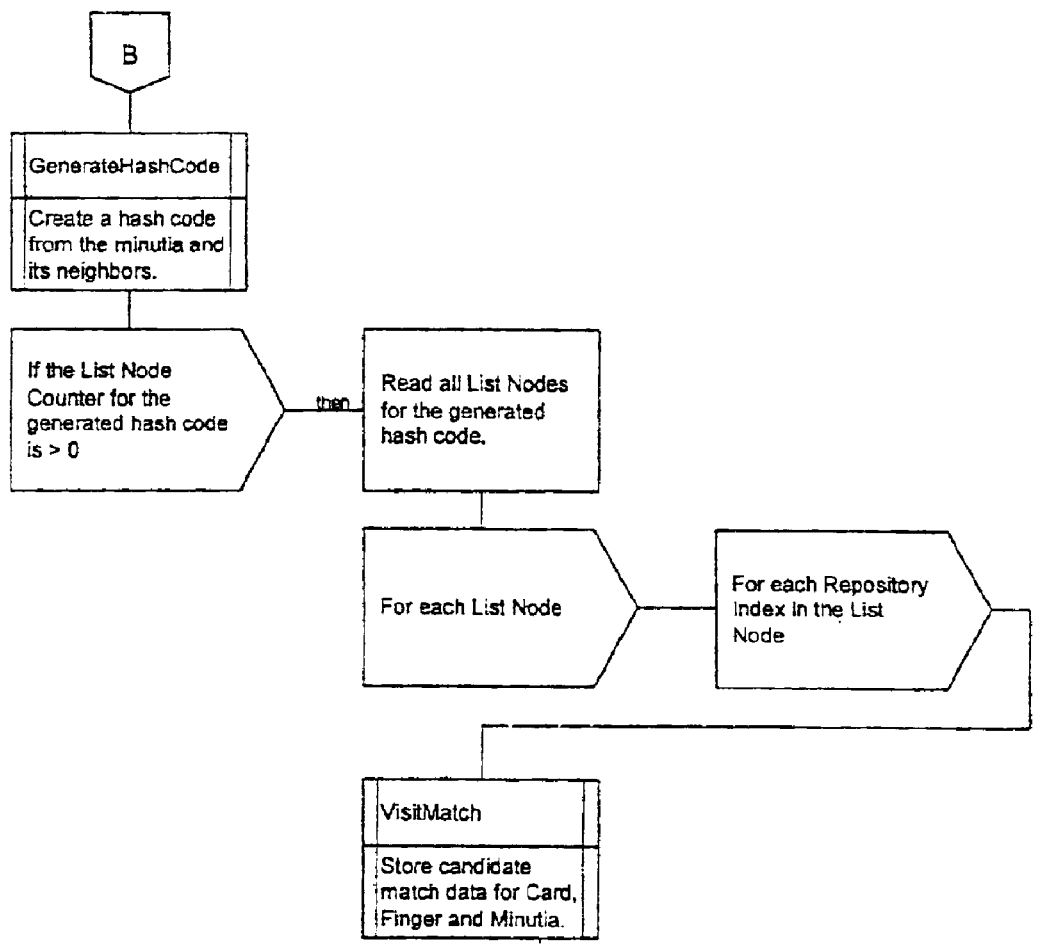

The IndexSearch subprogram flow diagram is shown in FIGS. 14 and 15. The Indexsearch subprogram reads a search feature vector V, identifies all repository subjects that contain similar minutiae (candidate mates), then evaluates the candidate mates, selecting the best possible matches (if any) and appending them to the result list. After reading the search feature vector V, the subprogram searches the appropriate finger(s) F, minutiae M and neighbor combinations C. If the neighbor combination C exists for minutia M of finger F, a hash code is generated for the minutia and neighbor parameters. If the hash code entry in Hash Table T[F][C] contains list nodes, the nodes are read from the Hash List file L[F][C]. The VisitMatch subprogram is invoked for every repository index in every list node for the hash code. VisitMatch (described later) accumulates match data for every candidate mate in the search.

When all of the minutiae and neighbor combinations have been processed, in step 6 of the method of the present invention, EvaluateMatch is invoked to score and rank all of the candidate mates. EvaluateMatch (described later) generates the list of the most likely mates from all of the candidates.

The VisitMatch subprogram flow diagram is shown in FIG. 16. The VisitMatch subprogram is invoked for all candidate mates in the hash list. It is called with the repository index which contains the subject index S, the finger index F and the minutia index M for each candidate mate. It maintains a transfer vector, whose index is the subject index field of the repository index, that points to a candidate mate evaluation structure as shown in FIG. 17. The purpose of the transfer vector is to minimize the amount of memory that must be cleared at the completion of each search. The entire transfer vector must be cleared, but only those MatchData entries that were used in the search need be cleared. Since the MatchData entries are significantly larger than the TransferVector entries, there is a net reduction in memory addresses which are cleared.

Each MatchData entry consists of the following data for each finger used for the search (also shown in FIG. 18):

The VisitCounter which is incremented every time a given Subject/Finger is visited.

The MinutiaBitMap which contains one bit for each expected minutia; the appropriate bit is set when a given minutia participates in the match. The number of bits set matches the number of individual minutiae that participated in the match operation.

The Hough Accumulator (HoughAcc) which is used to accumulate the search minutiae-file minutiae relationships via a multi-dimensional Hough Transform.

The MatchScore which is used during match evaluation to provide a single number whose value is proportional to the degree of match between the search fingerprint and the file fingerprint.

The VisitMatch subprogram checks the TransferVector for search subject S. If the value is zero, (meaning that the subject has not yet been processed during the current search), the DataCounter is incremented (counting the number of subjects processed) and its value is placed in TransferVector[S] and pointer P. If the value of TransferVector[S] is non-zero, (meaning that MatchData already exists for the subject S) the value of TransferVector[S] is placed in pointer P. Subsequent operations are performed on MatchData[P][F].

If the bit representing minutia M is not set in the MinutiaBitMap of MatchData[P][F], it is set to indicate that minutia M has participated in the match, and AccumulateHough is invoked to calculate and accumulate Hough Transform data. The VisitCounter in MatchData is incremented to count the total number of visits to this Subject/Finger.

Figure 19:
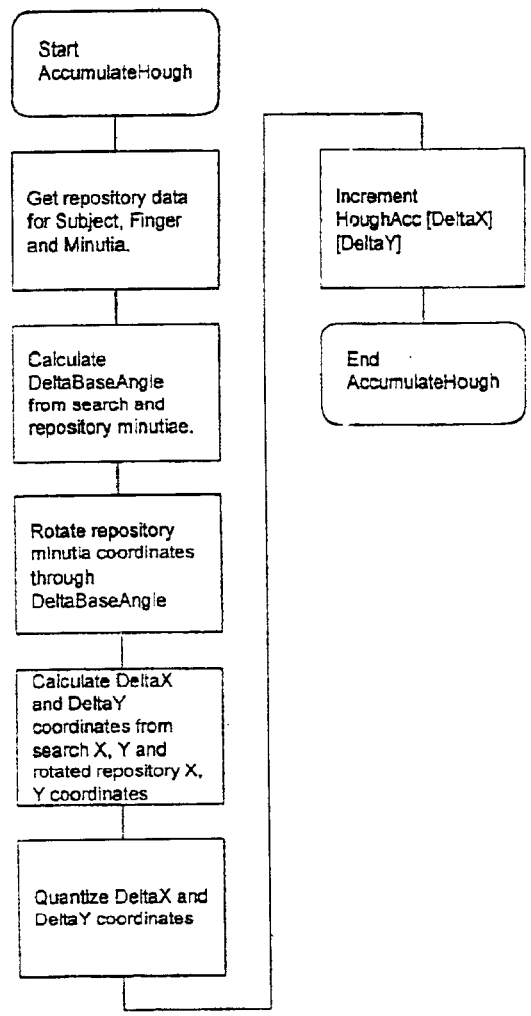
FIG. 19 illustrates the steps of the AccumulateHough subprogram.

The AccumulateHough subprogram flow diagram is shown in FIG. 19. The base angle and Cartesian coordinates for the Subject S, Finger F, Minutia M are obtained from the repository. The difference in base angles between the repository and search minutiae is calculated, giving DeltaBaseAngle. The repository Cartesian coordinates are rotated through DeltaBaseAngle (using standard trigonometric rotation techniques). The difference between the search minutia's coordinates and the rotated repository minutia coordinates is calculated giving DeltaX and DeltaY. DeltaX and DeltaY are quantized to the range 0 . . . 7 and used to increment the Hough accumulator HoughAcc [DeltaX][DeltaY].

Figure 21:
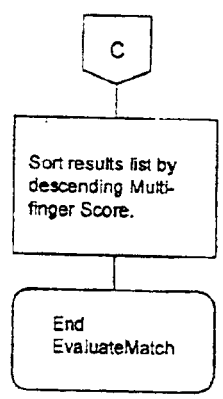

The EvaluateMatch subprogram flow diagram is shown in FIGS. 20 and 21. The MatchData for each finger of each candidate subject is analyzed to create a raw score using the following equation: RawScore=(VisitCount−MinutiaCount)*(max(HoughAcc[0 . . . 7][0 . . . 7]))

The VisitCount variable effectively counts the number of minutia matches summed over all of the participating neighbor combinations. The MinutiaCount variable effectively counts the number of individual minutiae matches regardless of the source neighbor combination.

There are other possible means of calculating the raw score. The most promising of these are similar to the above equation but which replace the maximum HoughAcc value with the maximum of the sum of a cross pattern or a block pattern in the Hough Accumulator as in:

| 0 1 0 | 1 1 1 |
| 1 1 1 | 1 1 1 |
| 0 1 0 | 1 1 1 | where we sum the neighboring cells which are indicated by 1's in the two pattern masks.

The raw score for each finger of each candidate subject is then normalized using statistical techniques appropriate for the observed exponential distribution of the raw scores. The standard deviation of the entire set of scores for the finger is calculated. The each raw score is then divided by the standard deviation to produce a normalized exponential score for the Subject/Finger. The normalized exponential scores for each finger of each Candidate Mate are combined to produce a multi-finger score by summation. The Candidate Mates are scanned from first to last. If the multi-finger score for a particular Candidate Mate exceeds a predetermined threshold, that subject is appended to the result list. The result list is then sorted in descending multi-finger-score order. The value of the threshold is a function of the operating point which produces the Reliability and Selectivity desired from the search process.

The output of the subprogram is a list of Candidate Mate subjects ordered from most likely (highest score) through least likely (lowest score).

Although the present invention has been described in terms of specific exemplary embodiments, it will be appreciated that various modifications and alterations might be made by those skilled in the art without departing from the spirit and scope of the invention as specified in the following claims.

What is claimed is:

1. A method of fast fingerprint search space partitioning and prescreening, said method comprising the steps of:

inputting the contents of a fingerprint repository comprising file fingerprints for index creation;

creating an index based on each minutia and selected neighbors of each minutia in each file fingerprint in the repository;

searching the index to identify all minutiae which correspond to the minutiae in a search fingerprint; and analyzing results of this search to determine which file fingerprints contributed the most minutiae with the best correspondence to the minutiae in the search fingerprint, wherein each file fingerprint of the fingerprint repository includes the following data: the number of minutiae in the fingerprint; and for each minutia: the base angle of the minutia in a frame of reference whose angular orientation to and permissible deviation from the axis of the finger of the fingerprint is pre-defined; the Cartesian coordinates (X, Y) of the minutia relative to the same frame of reference; the minutia index of the nearest neighboring minutia in each of eight octants wherein each octant comprises a 45 degree wedge and the first octant of which is centered on the base angle of the minutia and wherein the nearest neighboring minutia are know as octant neighbors; a count of friction ridges between the minutia and each of its eight octant neighbors; an Euclidean distance between the minutia and each of its eight octant neighbors and the difference between the base angle of the minutia and the base angle of each of its eight octant neighbors.

2. A method according to claim 1, wherein the index created from the repository of file fingerprints comprises the following information: 1) an index of each subject in the repository; 2) an index of each finger of each subject; and 3) an index of the minutia for each finger of each subject in the repository.

3. A method according to claim 1, wherein if an index already exists, subjects of the repository are compared with subjects of the existing index to determine whether a subject of the repository is already in the index to prevent duplication of subjects in the index.

4. A method according to claim 1, wherein the step of creating the index includes creating neighbor combinations for each finger of each subject of the repository wherein a neighborhood combination is based on selecting 2 of eight octant neighbors to produce 28 possible combinations per finger.

5. A method according to claim 4, wherein the step of creating the index further includes the step of creating a hash table file for each finger-neighbor combination.

6. A method according to claim 5, wherein the hash table file includes the following information: an index of a hash list node in the hash list file and the number of hash list nodes associated with a hash code.

7. A method according to claim 6, wherein the hash code is at least a 15-bit hash code.

8. A method according to claim 4, wherein the step of creating the index further includes the step of creating a hash list file for each finger-neighbor combination wherein a hash list comprises N hash list nodes, where N is a function of the number of minutiae in the repository, plus any room needed for repository expansion.

9. A method according to claim 8, wherein each hash list node contains the following data: a hash code to identify the hash list file, the number of populated repository index slots in the hash list file and a plurality of repository index slots.

10. A method according to claim 9, wherein the optimum number of slots in a node is a function of the hash code distribution which is a function of the fingerprint characteristics in the repository.

11. A method according to claim 4, wherein the step of creating the index further includes creating one hash list node used file for each finger-neighbor combination wherein a hash list node used file is a bookkeeping device which tracks which hash list nodes in the file are populated at any given time.

12. A method according to claim 4, wherein each neighbor combination of each minutia of each finger of each subject of the repository which is not already in the index is added into the index.

13. A method according to claim 1, wherein the step of searching the index comprises the steps of identifying all subjects that contain minutiae and neighbor combinations similar to minutiae and neighbor combinations of the search fingerprint and creating a list of candidate subjects.

14. A method according to claim 13, wherein, when all of the minutiae and neighbor combinations have been processed, the step of analyzing the search results comprises scoring and ranking each of the candidate subjects.

15. A method according to claim 14, wherein the step of analyzing the search results further include generating a list of the most likely matches from all of the candidate subjects of the list.

16. A method according to claim 13, wherein the following data for each finger is used for the search: 1) the number of times a given finger is visited during the search; 2) the number of individual minutiae that participate in a match; 3) the degree to similarity between the orientation of the minutia of the search fingerprint and a file fingerprint; and 4) a score which is proportional to the degree of match between the search fingerprint and the file fingerprint.

17. A method according to claim 16, wherein after the data is collected during the search, the step of analyzing the search comprises formulating a raw score according to the following equation: Raw Score=(VisitCount−MinutiaCount)*(max(degree of similarity between the orientation of the minutia of the search fingerprint and the file fingerprint)).

18. A method according to claim 17, wherein the raw score for each finger of each candidate subject is normalized using statistical techniques appropriate for the observed exponential distribution of the raw scores.

19. A method according to claim 18 wherein the standard deviation of the entire set of scores for the finger is calculated and the each raw score is then divided by the standard deviation to produce a normalized exponential score for the Subject/Finger and the normalized exponential scores for each finger of each candidate mate are combined to produce a multi-finger score by summation.

20. A method according to claim 19, wherein candidate mates are scanned from first to last and if the multi-finger score for a particular candidate mate exceeds a predetermined threshold, that subject is appended to the result list.

21. A method according to claim 20, wherein the list is sorted in descending multi-finger-score order to create a list of candidate mate subjects ordered from most likely (highest score) through least likely (lowest score).

* * * * *